(12) United States Patent
Lin et al.

(10) Patent No.: US 11,227,638 B2
(45) Date of Patent: Jan. 18, 2022

(54) METHOD, SYSTEM, MEDIUM, AND SMART DEVICE FOR CUTTING VIDEO USING VIDEO CONTENT

(71) Applicant: Sunday Morning Technology (Guangzhou) Co., Ltd., Guangdong (CN)

(72) Inventors: Qianya Lin, Guangdong (CN); Tian Xia, Guangdong (CN); RemyYiYang Ho, Guangdong (CN); Zhenli Xie, Guangdong (CN); Pinlin Chen, Guangdong (CN); Rongchan Liu, Guangdong (CN)

(73) Assignee: Sunday Morning Technology (Guangzhou) Co., Ltd., Guangzhou (CN)

(*) Notice: Subject to any disclaimer, the term of this patent is extended or adjusted under 35 U.S.C. 154(b) by 0 days.

(21) Appl. No.: 16/935,222

(22) Filed: Jul. 22, 2020

(65) Prior Publication Data
US 2021/0319809 A1 Oct. 14, 2021

(30) Foreign Application Priority Data
Apr. 10, 2020 (CN) .......................... 202010281326.1

(51) Int. Cl.
*G11B 27/06* (2006.01)
*G11B 27/036* (2006.01)
*G10L 15/26* (2006.01)
*G06K 9/00* (2006.01)
*G11B 27/10* (2006.01)
*G10L 21/0208* (2013.01)
*G10L 25/57* (2013.01)

(52) U.S. Cl.
CPC .......... *G11B 27/06* (2013.01); *G06K 9/00281* (2013.01); *G06K 9/00335* (2013.01); *G06K 9/00744* (2013.01); *G10L 15/26* (2013.01); *G10L 21/0208* (2013.01); *G10L 25/57* (2013.01); *G11B 27/036* (2013.01); *G11B 27/10* (2013.01)

(58) Field of Classification Search
USPC .................................................. 386/239–248
See application file for complete search history.

(56) References Cited

U.S. PATENT DOCUMENTS

| 10,931,976 | B1* | 2/2021 | Joze ..................... G11B 27/036 |
| 2001/0047266 | A1* | 11/2001 | Fasciano ................ G11B 27/28 704/278 |

(Continued)

*Primary Examiner* — Hung Q Dang

(57) ABSTRACT

The present invention discloses a method and system for cutting video using video content. The method comprises: acquiring recorded video produced by user's recording operation; extracting features of recorded audio in the recorded video and judging whether the recorded audio is damaged; and if not, extracting human voice data from the recorded audio which has been filtered out background sound, intercepting video segment corresponding to effective human voice, and displaying the video segment as clip video; and if yes, extracting image feature data of person's mouth shape and human movements in the recorded video after image processing, fitting the image feature data and the human voice data which has been filtered out background sound, and displaying the video segment with the highest fitting degree as clip video.

3 Claims, 4 Drawing Sheets

(56) References Cited

U.S. PATENT DOCUMENTS

| | | | |
|---|---|---|---|
| 2006/0193671 A1* | 8/2006 | Yoshizawa | G10L 21/0208 400/208 |
| 2009/0285410 A1* | 11/2009 | Garcia | G10L 21/0208 381/94.1 |
| 2017/0287481 A1* | 10/2017 | Bhat | G10L 25/81 |
| 2020/0051565 A1* | 2/2020 | Singh | G10L 15/02 |

* cited by examiner

METHOD, SYSTEM, MEDIUM, AND SMART DEVICE FOR CUTTING VIDEO USING VIDEO CONTENT

CROSS-REFERENCE TO RELATED APPLICATIONS

The present application claims the benefit of Chinese Patent Application No. 202010281326.1 filed on Apr. 10, 2020. The contents of the above are hereby incorporated by reference.

FIELD OF THE INVENTION

The present invention relates to the technical field of artificial intelligence and is more particularly concerned with a method, system, medium and smart device for cutting video using video content.

BACKGROUND OF THE INVENTION

AI video clipping technology is to use the technology of image recognition or speech recognition to recognize and process video content intelligently, thereby the video content can be clipped intelligently, the efficiency of video clipping can be greatly improved, and the clipping costs can be saved. Therefore, AI video clipping technology has become an important part of the video clipping field.

As a common clipping technology in AI video clipping technology, image recognition automatic video clipping technology can recognize the designated object in video picture content through artificial intelligence, extract the video picture segment including the object, and realize the technology of quickly recognizing and clipping the corresponding segment of the designated image in one or more long videos.

However, in the prior art, the image recognition automatic video clipping technology only acquires the similar video segments without processing the audio, so that the noisy background sound or the video segments without sound will also be preserved, thereby greatly reducing the satisfaction of users in video clip experience.

SUMMARY OF THE INVENTION

To solve the above problem, the purpose of the present invention is to provide a method, system, medium and smart device for cutting video using video content, to solve the problem of low efficiency and poor video quality of existing video clipping technology and improve the satisfaction of users in video clip experience.

A method for cutting video using video content, the method comprises:

acquiring recorded video produced by user's recording operation;

extracting features of recorded audio in the recorded video and judging whether the recorded audio is damaged; and if not, extracting human voice data from the recorded audio which has been filtered out background sound, intercepting video segment corresponding to effective human voice, and displaying the video segment as clip video; and if yes, extracting image feature data of person's mouth shape and human movements in the recorded video after image processing, fitting the image feature data and the human voice data which has been filtered out background sound, and displaying the video segment with the highest fitting degree as clip video.

According to the method for cutting video using video content provided by the present invention, by extracting the features of the recorded audio in the recorded video produced by the user's recording operation to judge whether the recorded audio is damaged, and when the recorded video is damaged, extracting the human voice data filtered out background sound in the recorded audio, and intercepting the video segments corresponding to the effective human voice to remove the noisy background sound and save the video segments with human voice, even if the video is shot in a noisy environment, the speaker's voice can be clearly heard. And when the recorded audio is damaged, by extracting the image feature data of person's mouth shape and human movements in the recorded video after image processing, fitting the image feature data with the human voice data to output a video segment with a higher fitting degree, the damaged recorded audio can be restored according to the image information in the recorded video and the semantics of the existing effective human voice segments. At the same time, the invalid content in the recorded audio can be reduced to make the sound of the speaker in the video is more prominent, the materials, like stickers and sound effects, etc., can be added and synthesized according to the video content, the problem of low efficiency, poor video quality and low satisfaction of user's clipping experience in the prior art of video clipping can be solved, and the actual application needs can be met.

Further, according to the above method for cutting video using video content of the present invention, the method can also comprise the following additional technical features.

Further, the method for extracting human voice data from the audio which has been filtered out background sound, intercepting video segment corresponding to effective human voice, and displaying the video segment as clip video comprises:

identifying human voice video segments in the recorded video through AI model, extracting effective human voice data in the human voice video segments, filtering out background sound, and recording first time range corresponding to the effective human voice data;

converting the effective human voice data which has been filtered out background sound into text, and recording second time range corresponding to the text, and adjusting the first time range according to the second time range; and clipping and synthesizing the video segments including the effective human voice data according to the effective human voice data, the text corresponding to the effective human voice data, the adjusted time range and video picture in the recorded video, and displaying the effect of the obtained clip video.

Further, the method for extracting effective human voice data in the human voice video segments, filtering out background sound, and recording first time range corresponding to the effective human voice data comprises:

cutting the human voice data into a plurality of sound sub segments, extracting frequency information of each sound sub segment through the fast Fourier transform, filtering noise of each sound sub segment according to AI model based on CNN VAD algorithm and the frequency information of each sound sub segment, merging the sound sub segment filtered out noise into a sound segment with continuous sound, and recording the time period corresponding to the sound segment as the first time range.

Further, the method for extracting image feature data of person's mouth shape and human movements in the recorded video after image processing comprises:

acquiring image frame containing person in talking in the recorded video, and performing image recognition and analysis on the person's mouth shape and human movements in the image frame to obtain lip information of the person's mouth shape and movement information of the human movements; and extracting features of the lip information of the person's mouth shape and the movement information of the human movements to acquire the corresponding image feature data.

Further, the method further comprises:

performing semantic segmentation on the text corresponding to the effective human voice data to acquire a plurality of segmentation semantics; and searching audio and video stickers matching the segmentation semantics in material library, placing the video stickers matching the segmentation semantics in corresponding positions, and adding the audio matching the segmentation semantics to the corresponding position of the video segment.

Further, the method for placing the video stickers matching the segmentation semantics in corresponding positions, and adding the audio matching the segmentation semantics to the corresponding position of the video segment comprises:

calculating a plurality of effective placing positions of the stickers according to the video picture information which need to be placed video sticker, and adjusting size of video wallpaper according to the effective placing positions of the stickers; and adjusting time area and track information of the audio to be added according to the text corresponding to the effective human voice data and the time when the video picture appears.

Further, the method further comprises:

calculating the time when the video sticker and audio appear in the recorded video according to the time when the keyword corresponding to the video sticker and audio appears in the video track.

Another embodiment of the present invention proposes a system for cutting video using video content. The system solves the problem of low satisfaction of user's video clipping experience in the existing image recognition automatic video clipping technology, which only acquires the segments of similar images, and doesn't process the audio so that the noisy background sound or the video segments without sound will also be preserved.

According to the system for cutting video using video content of the embodiment of the present invention, comprises:

acquisition module, the acquisition module is configured to acquire recorded video produced by user's recording operation;

judgement module, the judgement module is configured to extract features of recorded audio in the recorded video and judge whether the recorded audio is damaged;

intercept module, the intercept module is configured to extract human voice data from the recorded audio which has been filtered out background sound, intercept video segment corresponding to effective human voice, and display the video segment as clip video; and fitting module, the fitting module is configured to extract image feature data of person's mouth shape and human movements in the recorded video after image processing, fit the image feature data and the human voice data which has been filtered out background sound, and display the video segment with the highest fitting degree as clip video.

Another embodiment of the present invention proposes a medium on which a computer program is stored, and when the program is executed by a processor, the steps of the above method are implemented.

Another embodiment of the present invention proposes a smart device, including a memory, a processor, and a computer program stored on the memory and executable on the processor, and when the processor executes the program, the above method is implemented.

Additional aspects and advantages of the present invention will be given in the following description, and some of them will become apparent from the following description or will be known through embodiments of the present invention.

DETAILED DESCRIPTION OF THE INVENTION

To make the objectives, technical solutions, and advantages of the embodiments of the present invention clearer, the technical solutions in the embodiments of the present invention will be described clearly and completely in conjunction with the drawings in the embodiments of the present invention. Obviously, the described embodiments are parts of the embodiments of the present invention, and not all the embodiments. Based on the embodiments of the present invention, all other embodiments obtained by a person of ordinary skill in the art without creative work fall within the protection scope of the present invention.

Figure 1:
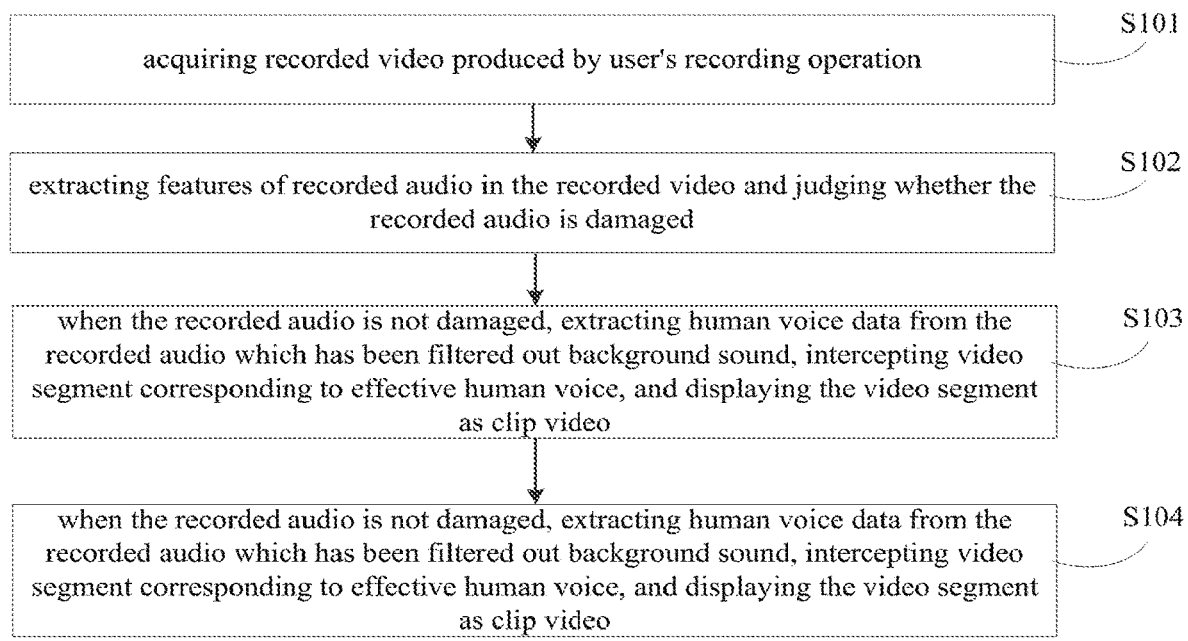
FIG. 1 is a flow diagram of a method for cutting video using video content proposed in the first embodiment of the present invention.

Please refer to FIG. 1. The first embodiment of the present invention proposes a method for cutting video using video content. Wherein, the method comprises the steps of S101-S104.

Step S101, acquiring recorded video produced by user's recording operation.

Step S102, extracting features of recorded audio in the recorded video and judging whether the recorded audio is damaged.

As described above, when a user performs recording operation, the recorded video produced by the user's recording operation is acquired. The recorded video is usually a video recording including person image and sound data, and it can be understood that the recorded video can also be a recorded video without person. By extracting features of the recorded audio in the recorded video, it can be determined whether the recorded audio is damaged according to the extracted feature information of the recorded audio, to avoid affecting the completeness and reliability of video clipping due to the damaged recorded audio, and at the same time, to provide the necessary conditions for subsequent video compensation and clipping according to the person image information of the recorded video.

Specifically, when user turns on a camera to record a person's video, the camera detects the effective human voice data and image information within the target range to form a recorded video. That is, the recorded video includes images and sound signals. Then video pre-processing to the video content of the recorded video is performed, such as one or more of the adjustment of brightness, saturation, contrast and color, continuous processing, deblocking/de-loop filtering processing, boundary detection, deinterleaving processing, frame rate conversion processing, noise filtering processing and color space conversion processing. The recorded video after video pre-processing is separated into voice stream and video stream, then the recorded audio in the voice stream is extracted, and the features of the audio information of the recorded audio is extracted, the features of the recorded audio in the recorded video is extracted, and whether the recorded audio is damaged is judged according to the extracted audio features. It can be understood that, by judging the integrity of the recorded audio, it provides the necessary conditions for subsequent video compensation and clipping according to the person image information of the recorded video, and the actual application needs can be met.

Step S103, when the recorded audio is not damaged, extracting human voice data from the recorded audio which has been filtered out background sound, intercepting video segment corresponding to effective human voice, and displaying the video segment as clip video.

As described above, when the recorded audio is not damaged, it means that the recorded audio is a complete recorded audio, and the audio corresponds to the video picture, so it is only need to intercept the video segment corresponding to the human voice data which has been filtered out background sound, and synthesize the video segment after the interception to get the clip video, and then display the clip video. Wherein, the method for synthesizing the video segment including effective human voice comprises: matching the video picture and the human voice audio according to the image vector information and the image frame of each effective video segment and the vector information and the audio frame of the effective human voice, and the image vector information and the voice vector information are respectively used to represent the direction of next image content and voice content.

Figure 2:
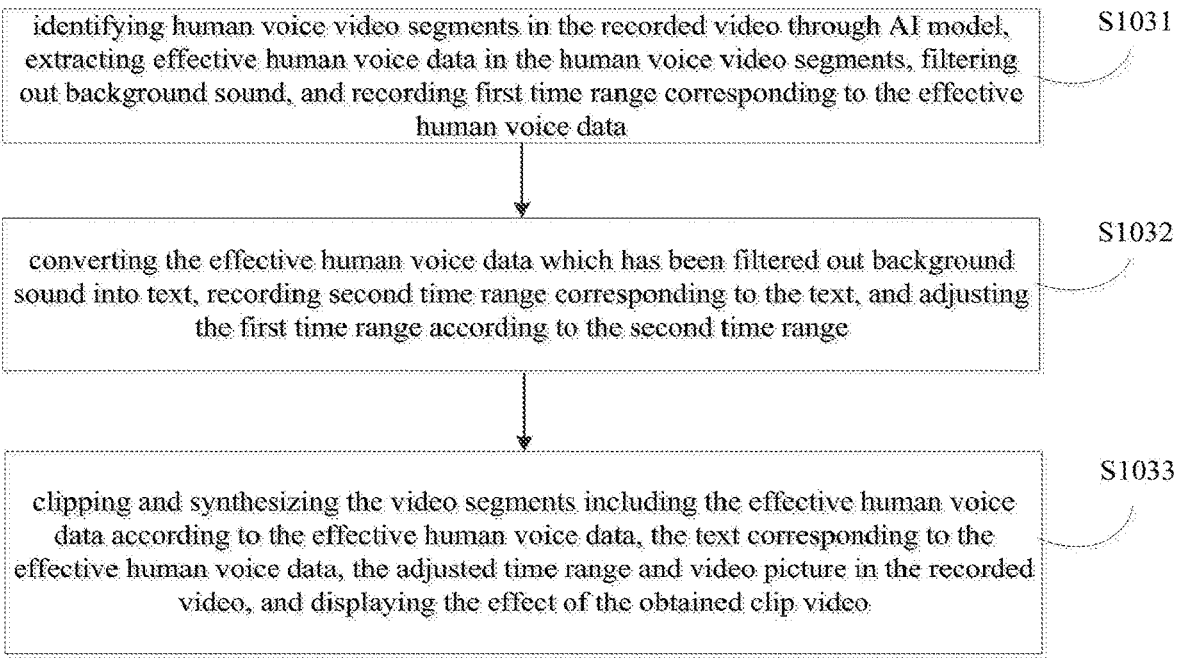
FIG. 2 is a specific flow diagram of the step S101 in FIG. 1.

Please refer to FIG. 2. The method for extracting human voice data from the recorded audio which has been filtered out background sound and intercepting video segment corresponding to effective human voice comprises the following steps.

Step S1031, identifying human voice video segments in the recorded video through AI model, extracting effective human voice data in the human voice video segments, filtering out background sound, and recording first time range corresponding to the effective human voice data.

Step S1032, converting the effective human voice data which has been filtered out background sound into text, recording second time range corresponding to the text, and adjusting the first time range according to the second time range.

Step S1033, clipping and synthesizing the video segments including the effective human voice data according to the effective human voice data, the text corresponding to the effective human voice data, the adjusted time range and video picture in the recorded video, and displaying the effect of the obtained clip video.

Specifically, the human voice data is cut into a plurality of sound sub segments, the frequency information of each sound sub segment is extracted through the fast Fourier transform, the noise of each sound sub segment is filtered through the AI model based on CNN VAD algorithm, the sound sub segments filtered out noise are merged into a sound segment with continuous sound, and the time period corresponding to the sound segment is recorded as the first time range. The audio is converted into text according to the AI model based on the DFCNN algorithm and the time range of sound sub segments of the effective human voice data filtered out background sound, the time range corresponding to the text is determined, the time range corresponding to the text is taken as the second time range, and the first time range corresponding to the effective human voice data is further adjusted according to the second time range to make the audio and text of the clip video correspond to the picture.

Step S104, when the recorded audio is damaged, extracting image feature data of person's mouth shape and human movements in the recorded video after image processing, fitting the image feature data and the human voice data which has been filtered out background sound, and displaying the video segment with the highest fitting degree as clip video.

As described above, when the recorded audio is damaged, it indicates that the recorded audio is not a complete recorded audio, and the audio does not correspond to the video picture, so the damaged audio needs to be compensated according to the video picture of the recorded video, and after the audio compensation is performed, the recorded audio needs to be fitted with the video picture to output a video segment with high-fitting degree, so that when the recorded audio is damaged, the video content can be restored and cut as much as possible according to the video picture information and the semantic information of the undamaged effective human voice segments, and the clipped content is video content with human voice segments, thereby improving the satisfaction of users in video clip. It can be understood that, in other embodiments of the present invention, the recorded video needing to clip can be targeted to clip according to the configuration information of the user on the video clipping interface and the historical data of the video clipping performed by the user, to reduce the operation steps when the user clips the video, and improve the satisfaction of users in video clip. Wherein, the configuration information can be one or more of the feature clip, person clip and picture clip of the clip, the inventor can adjust them according to actual application needs, and will not limited here.

Figure 3:
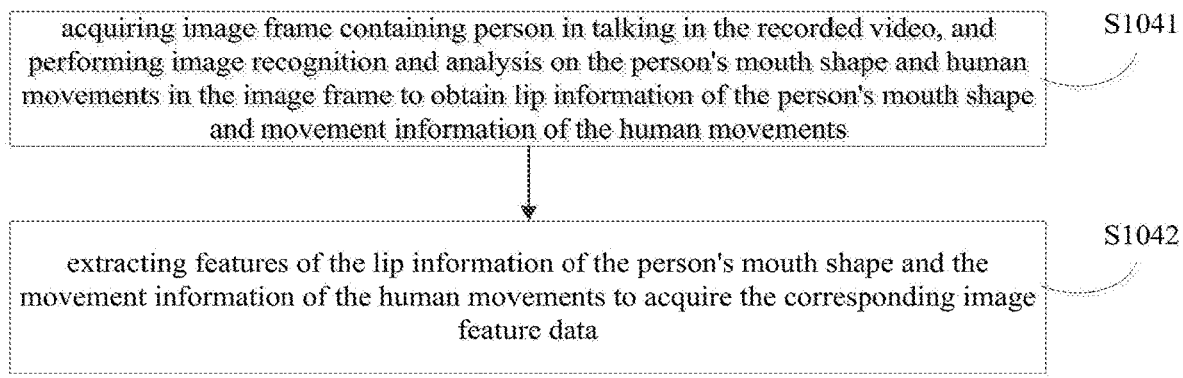
FIG. 3 is a specific flow diagram of the step S102 in FIG. 1.

Please refer to FIG. 3. The method for extracting image feature data of person's mouth shape and human movements in the recorded video after image processing comprises the following steps.

Step S1041, acquiring image frame containing person in talking in the recorded video, and performing image recognition and analysis on the person's mouth shape and human movements in the image frame to obtain lip information of the person's mouth shape and movement information of the human movements.

Step S1042, extracting features of the lip information of the person's mouth shape and the movement information of the human movements to acquire the corresponding image feature data.

As described above, by dividing the recorded video into several image frames, performing image recognition and analysis on the person's mouth shape and human movements in each image frame, and extracting features according to the lip information of the person's mouth shape and the movement information of the human movements to obtain the corresponding image feature data, the video content can be restored and cut according to the image feature data, the rate of change of the person's mouth shape and the human movements in each image frame and the semantics of the text corresponding to the effective human voice data, so that the clipping content is the video content with human voice segments.

It should also be noted here that the method further comprises: performing semantic segmentation on the text corresponding to the effective human voice data to acquire a plurality of segmentation semantics; and searching audio and video stickers matching the segmentation semantics in material library, placing the video stickers matching the segmentation semantics in corresponding positions, and adding the audio matching the segmentation semantics to the corresponding position of the video segment.

Further, the method for placing the video stickers matching the segmentation semantics in corresponding positions, and adding the audio matching the segmentation semantics to the corresponding position of the video segment comprises: calculating a plurality of effective placing positions of the stickers according to the video picture information which need to be placed video sticker, and adjusting size of video wallpaper according to the effective placing positions of the stickers; adjusting time area and track information of the audio to be added according to the text corresponding to the effective human voice data and the time when the video picture appears; and calculating the time when the video sticker and audio appear in the recorded video according to the time when the keyword corresponding to the video sticker and audio appears in the video track.

Specifically, the text corresponding to the effective human voice data is performed semantic segmentation from front to back to acquire multiple segmentation semantics which can be one or more of address, name, word or sentence. Audio and video stickers matching the segmentation semantics are searched in the material library. When the width of the face rectangle data of the current video picture is greater than 30% of the width of the display screen, the width of the rectangle is widened by 40%, the upper part of the rectangle is increased by 60%, and the lower part of the rectangle is increased by 30%, to ensure that the width of the whole rectangle is not less than 65% of the width of the display screen. Then, the inscribed ellipse of the rectangle is drawn. The points, which have been divided into 8-10 points, on the ellipse are the spare points for the sticker, and the points outside the screen are unavailable points. During calculation, a default video sticker size will be placed at each point, wherein the width of the sticker is 45% of the width of the face expanded rectangle, and when the area of the video sticker placed here exceeds 20% of the screen, it is determined that this point is an invalid point. After excluding the unavailable points and invalid points, the rest points are valid and available. The final position of the video stickers is in a random valid and available points, and the appear point of the next video sticker should avoid the appear points of the previous video stickers. The final rendering effect is that the video sticker appears around the human face and does not cover the human face. When the final judgment is that there are less than 3 valid and available points, the width of the point in the center is 80% of the player width of the rectangle in the safe area, and the height of the point in the center is 70% of the player height of the rectangle in the safe area. At this time, it is judged whether the deviation degree of upward/downward of the center point of the rectangle is greater than 5% of height of the screen. When the deviation degree of upward/downward of the center point of the rectangle is greater than 5% of height of the screen, only points in the opposite direction are used. When there is no face or the face is less than 30% of width of the screen, placing a default rectangle with 300*380 in the middle of the screen. The points on the inscribed ellipse are the default valid and available points, and the video sticker will appear at these points. At this time, the size of the video sticker is 60% of the width of the rectangle. Wherein, the deflection angles of all of the video stickers on the left side of the screen are 0-45 degrees clockwise and the deflection angles of all of the video stickers on the right side of the screen are 0-45 degrees counterclockwise. The appearance time of the video sticker is the appearance time of the text matching with the sticker on the video track. When the appearance time of the text of the effective human voice data of the current picture is 20 seconds, the audio segments matching the current text semantics/context acquired from the material library are clipped and track information of the audio segments are adjusted, to make the appearance time of the audio is the appearance time of the text matching the audio on the video track, and the volume of the audio is 43-60% of the effective human voice data.

According to the method for cutting video using video content provided by the present invention, by extracting the features of the recorded audio in the recorded video produced by the user's recording operation to judge whether the recorded audio is damaged, and when the recorded video is damaged, extracting the human voice data filtered out background sound in the recorded audio, and intercepting the video segments corresponding to the effective human voice to remove the noisy background sound and save the video segments with human voice, even if the video is shot in a noisy environment, the speaker's voice can be clearly heard. And when the recorded audio is damaged, by extracting the image feature data of person's mouth shape and human movements in the recorded video after image processing, fitting the image feature data with the human voice data to output a video segment with a higher fitting degree, the damaged recorded audio can be restored according to the image information in the recorded video and the semantics of the existing effective human voice segments. At the same time, the invalid content in the recorded audio can be reduced to make the sound of the speaker in the video is more prominent, the materials, like stickers and sound effects, etc., can be added and synthesized according to the video content, the problem of low efficiency, poor video quality and low satisfaction of user's clipping experience in the prior art of video clipping can be solved, and the actual application needs can be met.

Figure 4:
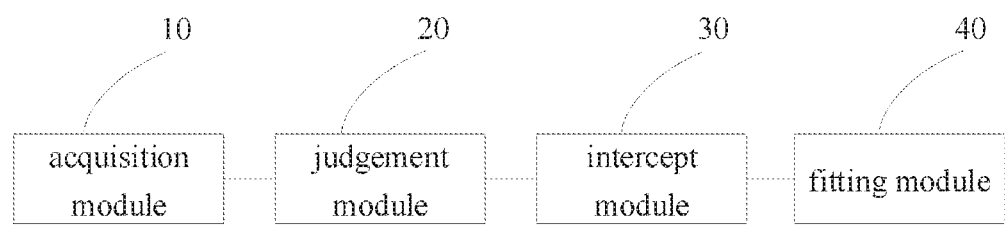
FIG. 4 is a structure diagram of a system for cutting video using video content proposed in the second embodiment of the present invention.

Please refer to FIG. 4. based on the same invention concept, the system for cutting video using video content provided by the second embodiment of the present invention comprises:

acquisition module 10, the acquisition module 10 is configured to acquire recorded video produced by user's recording operation;

judgement module 20, the judgement module 20 is configured to extract features of recorded audio in the recorded video and judge whether the recorded audio is damaged; and intercept module 30, the intercept module 30 is configured to extract human voice data from the recorded audio which has been filtered out background sound, intercept video segment corresponding to effective human voice, and display the video segment as clip video.

Further, the intercept module 30 comprises:

recording unit, the recording unit is configured to identify human voice video segments in the recorded video through AI model, extract effective human voice data in the human voice video segments, filter out background sound, and record first time range corresponding to the effective human voice data.

Specifically, the human voice data is cut into a plurality of sound sub segments, the frequency information of each sound sub segment is extracted through the fast Fourier transform, the noise of each sound sub segment is filtered through the AI model based on CNN VAD algorithm, the sound sub segments filtered out noise are merged into a sound segment with continuous sound, and the time period corresponding to the sound segment is recorded as the first time range.

Adjustment unit, the adjustment unit is configured to convert the effective human voice data which has been filtered out background sound into text, record second time range corresponding to the text, and adjust the first time range according to the second time range.

Synthesizing unit, the synthesizing unit is configured to clip and synthesize the video segments including the effective human voice data according to the effective human voice data, the text corresponding to the effective human voice data, the adjusted time range and video picture in the recorded video, and display the effect of the obtained clip video.

Fitting module 40, the fitting module 40 is configured to extract image feature data of person's mouth shape and human movements in the recorded video after image processing, fit the image feature data and the human voice data which has been filtered out background sound, and display the video segment with the highest fitting degree as clip video.

Further, the fitting module 40 comprises:

identification unit, the identification unit is configured to acquire image frame containing person in talking in the recorded video, and perform image recognition and analysis on the person's mouth shape and human movements in the image frame to obtain lip information of the person's mouth shape and movement information of the human movements; and extraction unit, the extraction unit is configured to extract features of the lip information of the person's mouth shape and the movement information of the human movements to acquire the corresponding image feature data.

Further, the fitting module further comprises:

cut unit, the cut unit is configured to perform semantic segmentation on the text corresponding to the effective human voice data to acquire a plurality of segmentation semantics.

Specifically, a plurality of effective placing positions of the stickers are calculated according to the video picture information which need to be placed video sticker, and the size of video wallpaper is adjusted according to the effective placing positions of the stickers; and time area and track information of the audio to be added are adjusted according to the text corresponding to the effective human voice data and the time when the video picture appears.

Adding unit, the adding unit is configured to search audio and video stickers matching the segmentation semantics in material library, place the video stickers matching the segmentation semantics in corresponding positions, and add the audio matching the segmentation semantics to the corresponding position of the video segment; and calculate the time when the video sticker and audio appear in the recorded video according to the time when the keyword corresponding to the video sticker and audio appears in the video track.

In the present invention, the acquisition module, judgment module, intercept module and fitting module can be one or more independent processors or processing chips respectively. If necessary, it can also include memory, relevant interface and system transmission bus, even including input/output device, display device, communication device, etc. The processor executes the code relating program to realize the corresponding functions. In addition, the replaceable solution is that the acquisition module, judgment module, intercept module and fitting module in the present invention can also share at least one of the following items: digital signal processor, central processing unit, nonvolatile memory, random access memory, system bus and interface. The shared CPU and DSP execute code relating program to realize their respective functions.

The recording unit, adjustment unit and synthesizing unit in the intercept module can be one or more processors, memories and display devices. The identification unit, extraction unit, cut unit and adding unit in the fitting module can be one or more processors and memory. Alternatively, the replaceable solution is that each unit shares a processor, memory, display device and other devices.

According to the method for cutting video using video content provided by the present invention, by extracting the features of the recorded audio in the recorded video produced by the user's recording operation to judge whether the recorded audio is damaged, and when the recorded video is damaged, extracting the human voice data filtered out background sound in the recorded audio, and intercepting the video segments corresponding to the effective human voice to remove the noisy background sound and save the video segments with human voice, even if the video is shot in a noisy environment, the speaker's voice can be clearly heard. And when the recorded audio is damaged, by extracting the image feature data of person's mouth shape and human movements in the recorded video after image processing, fitting the image feature data with the human voice data to output a video segment with a higher fitting degree, the damaged recorded audio can be restored according to the image information in the recorded video and the semantics of the existing effective human voice segments. At the same time, the invalid content in the recorded audio can be reduced to make the sound of the speaker in the video is more prominent, the materials, like stickers and sound effects, etc., can be added and synthesized according to the video content, the problem of low efficiency, poor video quality and low satisfaction of user's clipping experience in the prior art of video clipping can be solved, and the actual application needs can be met.

The technical features and technical effects of the system for cutting video using video content proposed in the embodiment of the invention are the same as those of the method proposed in the embodiment of the invention, and will not be repeated here.

Further, the embodiment of the present invention proposes a medium on which a computer program is stored, and when the program is executed by a processor, the steps of the above method are implemented.

Further, the embodiment of the present invention proposes a smart device, including a memory, a processor, and a computer program stored on the memory and executable on the processor, and when the processor executes the program, the steps of the above method are implemented.

The logic and/or steps represented in the flowchart or otherwise described herein, for example, can be regarded as a sequenced list of executable instructions for implementing logical functions, and can be specifically implemented in any computer-readable medium to use by or in combination with instruction execution systems, apparatus or devices, such as computer-based systems, systems including processors, or other systems that can fetch and execute instructions from instruction execution systems, apparatus or devices. For the purposes of this specification, computer-readable medium can be any device that can contain, store, communicate, propagate, or transmit a program for using by or in combination with the instruction execution system, apparatus or device.

More specific examples of computer-readable media (non-exhaustive list) include the following: electrical connections (electronic devices) with one or more wires, portable computer cartridges (magnetic devices), random access memory (RAM), read only memory (ROM), erasable programmable read-only memory (EPROM or flash memory), fiber optic devices, and portable compact disk read only memory (CDROM). In addition, the computer-readable medium can even be a paper or other suitable medium on which the program can be printed, because, for example, the paper or other medium can be optically scanned, and following be edited, deciphered, or processed, if necessary, in other appropriate manner to obtain the program electronically and then store it in computer memory.

It should be understood that each part of the present invention can be implemented by hardware, software, firmware, or a combination thereof. In the above embodiments, multiple steps or methods can be implemented by the software or firmware stored in memory and executed by a suitable instruction execution system. For example, if implemented by hardware, as in another embodiment, it can be implemented by any one or a combination of the following techniques known in the art: a discrete logic circuits including a logic gate circuit using to implement a logic function on a data signal, a dedicated integrated circuits with appropriate combinational logic gates circuit, programmable gate arrays (PGA), and field programmable gate arrays (FPGA), etc.

In the description of this specification, description of the reference terms, such as one embodiment, some embodiments, examples, specific examples or some examples, etc., means specific features, structure, material or characteristic described in conjunction with the embodiments or examples is included in at least one embodiment or example of the present invention. In this specification, the schematic expression of the above terms does not necessarily refer to the same embodiment or example. Moreover, the specific described features, structures, materials, or characteristics can be combined in any suitable manner in any one or more embodiments or examples.

Although the embodiments of the present invention have been shown and described, those of ordinary skill in the art can understand that various changes, modifications, substitutions, and variations can be made to these embodiments without departing from the principles and objectives of the present invention. The scope of the present invention is defined by the claims and their equivalents.

Finally, it should be noted that the above-mentioned embodiments are only specific implementations of the present invention to illustrate the technical solutions of the present invention rather than limit them, and the scope of protection of the present invention is not limited thereto. Although the present invention has been described in detail referring to the foregoing embodiments, those of ordinary skill in the art should understand that any person skilled in the art can still modify or easily change the technical solutions described in the foregoing embodiments within the technical scope disclosed by the present invention, or equally replace some of the technical features. However, these modifications, changes, or replacements do not deviate from the spirit and scope of the technical solutions of the embodiments of the present invention, and should be covered in the present invention, and these modifications, changes, or replacements should be within the protection scope of the present invention. Therefore, the protection scope of the present invention shall be subject to the protection scope of the claims.

The invention claimed is:

1. A system for cutting video using video content, wherein the system comprises:
   an acquisition module, the acquisition module is configured to acquire recorded video produced by user's recording operation;
   a judgement module, the judgement module is configured to extract features of recorded audio in the recorded video and judge whether the recorded audio is damaged;
   an intercept module, the intercept module is configured to extract human voice data from the recorded audio which has been filtered out background sound, intercept video segment corresponding to effective human voice, and display the video segment as clip video; and
   a fitting module, the fitting module is configured to extract image feature data of person's mouth shape and human movements in the recorded video after image processing, fit the image feature data and the human voice data which has been filtered out background sound, and display the video segment with the highest fitting degree as clip video;
   wherein the intercept module comprises:
   a recording unit, the recording unit is configured to identify human voice video segments in the recorded video through AI model, extract effective human voice data in the human voice video segments, filter out background sound, and record first time range corresponding to the effective human voice data;
   an adjustment unit, the adjustment unit is configured to convert the effective human voice data which has been filtered out background sound into a text, record second time range corresponding to the text, and adjust the first time range according to the second time range; and
   a synthesizing unit, the synthesizing unit is configured to clip and synthesize the video segments including the effective human voice data according to the effective human voice data, the text corresponding to the effective human voice data, the adjusted time range and video picture in the recorded video, and display the effect of the obtained clip video.

2. A non-transitory medium on which a computer program is stored, wherein when the program is executed by a processor, a method for cutting video using video content is implemented;
   wherein the method comprises the following steps:
   acquiring recorded video produced by user's recording operation;
   extracting features of recorded audio in the recorded video and judging whether the recorded audio is damaged; and
   if not, extracting human voice data from the recorded audio which has been filtered out background sound, intercepting video segment corresponding to effective human voice, and displaying the video segment as clip video; and
   if yes, extracting image feature data of person's mouth shape and human movements in the recorded video after image processing, fitting the image feature data and the human voice data which has been filtered out background sound, and displaying the video segment with the highest fitting degree as clip video;

wherein the method for extracting human voice data from the recorded audio which has been filtered out background sound, intercepting video segment corresponding to effective human voice, and displaying the video segment as clip video comprises:

identifying human voice video segments in the recorded video through AI model, extracting effective human voice data in the human voice video segments, filtering out background sound, and recording first time range corresponding to the effective human voice data;

converting the effective human voice data which has been filtered out background sound into a text, recording second time range corresponding to the text, and adjusting the first time range according to the second time range; and clipping and synthesizing the video segments including the effective human voice data according to the effective human voice data, the text corresponding to the effective human voice data, the adjusted time range and video picture in the recorded video, and displaying the effect of the obtained clip video.

3. A smart device, including a memory, a processor, and a computer program stored on the memory and executable on the processor, wherein when the processor executes the program, a method for cutting video using video content is implemented;

wherein the method comprises the following steps:

acquiring recorded video produced by user's recording operation;

extracting features of recorded audio in the recorded video and judging whether the recorded audio is damaged; and if not, extracting human voice data from the recorded audio which has been filtered out background sound, intercepting video segment corresponding to effective human voice, and displaying the video segment as clip video; and if yes, extracting image feature data of person's mouth shape and human movements in the recorded video after image processing, fitting the image feature data and the human voice data which has been filtered out background sound, and displaying the video segment with the highest fitting degree as clip video;

wherein the method for extracting human voice data from the recorded audio which has been filtered out background sound, intercepting video segment corresponding to effective human voice, and displaying the video segment as clip video comprises:

identifying human voice video segments in the recorded video through AI model, extracting effective human voice data in the human voice video segments, filtering out background sound, and recording first time range corresponding to the effective human voice data;

converting the effective human voice data which has been filtered out background sound into a text, recording second time range corresponding to the text, and adjusting the first time range according to the second time range; and clipping and synthesizing the video segments including the effective human voice data according to the effective human voice data, the text corresponding to the effective human voice data, the adjusted time range and video picture in the recorded video, and displaying the effect of the obtained clip video.

* * * * *